INVENTORS.
MURRAY G. STURROCK
KENNETH R. ROBINSON
EDWIN L. CLINE
BY
their ATTORNEY 3,091,620
PROCESS FOR PREPARING 3,8-DIHYDROXY-4,5, 6,7-DIBENZO-1,2-DIOXACYCLOOCTANE
Murray G. Sturrock and Edwin L. Cline, Pittsburgh, and Kenneth R. Robinson, Pitcairn, Pa., assignors to Koppers Company, Inc., a corporation of Delaware
Filed Aug. 16, 1960, Ser. No. 49,929
3 Claims. (Cl. 260—340.3)

This invention relates to a method of making phenanthrene derivatives. In one specific aspect, it relates to an ozonation-hydrolysis technique for making diphenaldehyde, diphenic acid, and other useful oxidation products of phenanthrene.

Phenanthrene, which comprises 3–5% of tar recovered from high temperature carbonization of bituminous coal, is a compound of limited chemical activity for which no large scale uses are known. Because of the relative abundance of phenanthrene in coal tar and in other source materials, workers in the art have long been in quest of a simple and efficient method for converting phenanthrene into one of its more useful derivatives, e.g. diphenic acid.

Diphenic acid has marked utility in the preparation of synthetic resins, plasticizers for synthetic resins and fibers. Bruson, in U.S. Patent 1,815,866, describes resins made from diphenic acid as being particularly suitable as coating compositions, lacquers and varnishes because of their unusual flexibility, adhesion and waterproof quality. Dazzi, in U.S. Patent 2,634,248, describes the use of diphenic acid in the preparation of plasticizers.

As early as 1905, one Harries (Annalen 343,373) attempted to prepare derivatives of phenanthrene by the ozonation of the parent compound in chloroform solution. He obtained as a product the explosive phenanthrene diozonide, but he prepared no further derivatives of that compound.

In recent years, there has been renewed interest in the ozonation of phenanthrene. Schmitt et al., JACS 77, 5640 (1955), ozonized phenanthrene in acetic acid and in chloroform. They isolated what they believed to be the mono-ozonide in 85% yield and converted it to diphenaldehyde by pouring the acetic acid solution of the ozonide into four volumes of cold water and allowing the ozonide to hydrolyze at room temperatures over a two-day period. A 43.5% yield of diphenaldehyde, based on the amount of phenanthrene charged, was obtained. Yields of this magnitude, the likelihood of the formation of explosive ozonides and the difficulty encountered in the recovery of solvent are serious handicaps to commercial development of such a process.

Bailey, JACS, 78, 3811 (1956), ozonized phenanthrene in anhydrous methyl alcohol solution at temperatures between 0 and −60° C., thereby obtaining a 78% yield of a product. By hydrolyzing this product in 10% aqueous caustic soda solution, Bailey obtained a 65% over-all yield, based upon the phenanthrene charged, of diphenaldehydic acid (2′-formyl-2-biphenylcarboxylic acid, M.P. 134° C.). He obtained a 65% over-all yield of diphenic acid by hydrolyzing the ozonation product in the presence of hydrogen peroxide and caustic. In the course of his work, Bailey also made crude diphenaldehyde (2,2′-biphenyl-dicarboxaldehyde) in an 84% yield by ozonation of phenanthrene in anhydrous methyl alcohol solution, treatment of the ozonation product thus formed with sodium iodide in sulfuric acid solution, removal of the liberated iodine with sodium thiosulfate and precipitation of the product by manifold dilution with water. While Bailey's work resulted in improvement over that of Schmitt et al., the multi-step process of Bailey is still too cumbersome to be regarded as economically attractive. Moreover, to make the diphenylaldehyde, he was forced to resort to using sodium iodide, an expensive chemical reducing agent, in order to obtain his desired product.

We have discovered a novel method for converting phenanthrene in high yield to any one of a number of valuable, ortho-ortho′ biphenyl derivatives by a combined ozonation-hydrolysis technique.

It is, therefore, an object of the present invention to provide a method for making in high yield ortho-ortho′ biphenyl derivatives from phenanthrene, including diphenaldehyde, 2′ - hydroxymethyl - 2 - biphenylcarboxylic acid, 2-2′-biphenyldimethanol and diphenic acid.

In accordance with the present invention, phenanthrene is suspended in a mixture of water and an organic solubilizing agent, capable of bringing the reactants together in a single reactive liquid phase, and is contacted with a gas stream containing ozone to make a peroxidic ozonation product. This ozonation product is then hydrolyzed to form one or more of a series of ortho-ortho′ di-substituted biphenyl derivatives. The particular biphenyl derivative obtained depends primarily upon the pH of the reaction mixture during the hydrolysis step. It is often convenient to accomplish hydrolysis and removal of the solubilizing agent from the system concomitantly.

An important feature of our invention is the suspension medium provided in the ozonation of phenanthrene. The Criegee mechanism of ozonation has now attained general acceptance, and according to it, ozonation solvents fall into one of two classes: (1) participating solvents which react with the so-called "zwitter ion" to form peroxidic products, and (2) non-participating solvents with which the "zwitter ion" does not react and therefore reacts with itself to form true ozonides. Surprisingly, we have found that water is capable of serving as the reaction-controlling solvent. When water is used in combination with an organic solubilizing agent to bring the phenanthrene, water and ozone into a single reactive liquid phase within the suspension, results are obtained which differ astonishingly from those obtainable using the media employed by prior workers, i.e. anhydrous alcohols, anhydrous chloroform, anhydrous carbon tetrachloride, anhydrous ethyl acetate and glacial acetic acid. The solubilizing agent selected must be one which is capable of dissolving a sufficient quantity of water and phenanthrene and which will facilitate ozone absorption. Surprisingly, suitable solubilizing agents embrace those which are conventionally classified both as participating and non-participating solvents; thus, it is the presence of a sufficient quantity of water in the reactive liquid phase which dictates the course of the reaction.

The novel suspension medium of the invention thus comprises water in admixture with a solubilizing agent comprising a member selected from the group consisting of lower alkanols having from 2–4 carbon atoms, lower alkyl acetates, acetic acid, propionic acid, dioxane, chloroform and mixtures thereof. We have found that the members of the foregoing group serve as primary solubilizing agents and, as such, are capable of dissolving water and phenanthrene to a sufficient extent to bring the water into a single reactive liquid phase consisting essentially of water, phenanthrene and ozone, thereby permitting the reaction, according to the process of the invention, between water and the zwitter ion. Of the members of the group, pure chloroform is marginal in this respect, but technical grade chloroform, which contains about 1% ethyl alcohol and thus represents a mixture of two members of the aforesaid group, works quite well.

For the lower water concentrations used in the suspension medium of the invention, phenanthrene is sufficiently soluble in the mixture of water and one or more of the primary solubilizing agents. As the water concentration is increased toward the upper permissible limit in the invention, the phenanthrene becomes less soluble. In such cases, it is helpful to include in the organic solubilizing agent portion of the suspension medium an inert hydrocarbon solvent for the phenanthrene which is miscible with the primary solubilizing agent. Thus, at higher concentrations of water, the solubilizing agent is conveniently a mixture of one or more of the members of the aforesaid group of primary solubilizing agents and an inert hydrocarbon solvent, such as an aliphatic hydrocarbon, e.g. hexane, heptane and the like, an aromatic hydrocarbon, e.g. benzene, toluene, xylene and the like, or a chlorinated hydrocarbon such as carbon tetrachloride and chlorobenzene. If such a mixed solubilizing agent system is used, it is necessary that it contain the primary solubilizing agent as defined hereabove in an amount sufficient to dissolve at least about 2% by weight water to provide the single reactive liquid phase consisting essentially of water, phenanthrene and ozone.

The fact that water exerts a greater influence on the course of the reaction than other solvents which have been used in the past for phenanthrene ozonation is evidenced by the formation, during the process of the invention, of a novel intermediate, 3,8-dihydroxy-4,5,6,7-dibenzo-1,2-dioxacyclooctane, hereinafter referred to as the dihydroxyperoxide. The formation of the dihydroxyperoxide in our novel reaction medium is most unexpected, since the use of participating solvents such as lower alkanols as a reaction medium for phenanthrene ozonation is known to give dialkoxyperoxides as an intermediate according to the process described by Phillip S. Bailey in U.S. Patent 2,870,194, and the use of nonparticipating solvents such as anhydrous ethyl acetate and anhydrous chloroform is known to give phenanthrene ozonide.

The choice of reaction conditions to cause the formation of the unique dihydroxyperoxide offers considerable advantage over the methods of prior workers in that the course of the ultimate reaction is changed to give products not easily obtainable by those methods. For example, the dihydroxyperoxide, a compound of the formula:

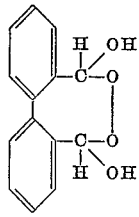

can be easily decomposed at a pH below about 10 to form diphenaldehyde and hydrogen peroxide as co-products. In contrast therewith, the dialkoxyperoxide, obtainable by the Bailey method referred to hereabove, has been converted by Bailey to diphenaldehyde using a process involving stringent temperature control and the use of an expensive inorganic reductant, such as sodium iodide. If the dihydroxyperoxide is hydrolyzed at a pH above 10, the principal product is the valuable ortho-hydroxymethyl-ortho'-carboxy biphenyl, useful in that it can be converted quantitatively to the commercially desirable diphenic acid by a method described hereafter. The alkaline hydrolysis of the dialkoxyperoxide of Bailey results in the formation of diphenaldehydic acid, a product in a higher state of oxidation. This marked contrast in results is emphatically demonstrated by FIGURES 1 and 2 of the drawing, which will be discussed hereafter.

The weight ratio of water to solubilizing agent varies within wide, although critically defined limits. In order for water to act as the reaction controlling solvent, two important conditions must be satisfied. First, the solubilizing agent must be one which, when saturated with water, is capable of dissolving at least about 2% by weight water and a measurable amount of hydrocarbon to form a single reactive liquid phase within the suspension. Second, a reservoir of water within the suspension must be provided so that resaturation of the solubilizing agent is attained rapidly and the water concentration in the single reactive liquid phase remains substantially constant. These conditions are met by providing in the reaction medium at least about 5% by weight water.

The alcohols useful as solubilizing agents in the present invention form an azeotropic mixture with water, which boils well below the boiling point of water, at certain fixed weight percent concentrations. For example, the azeotropic mixture of the ethanol-water system is formed at concentrations of 95% ethanol and 5% water, which satisfies the requirements for the minimum concentrates of water. For the tertiary-butyl alcohol water system, the azeotropic mixture comprises 88% tertiary-butyl alcohol and 12% water. Azeotropic mixtures of water and other alcohols are given in Lange, Hardbook of Chemistry, 9th Edition, page 1484. The use of azeotropic mixtures affords particular advantage in that hydrolysis of the ozonation product and recovery of the alcohol-water azeotrope are accomplished concurrently, and the recovered azeotrope is suitable for reuse. The azeotropic mixture of water and a particular alcohol represents the lower limit of water concentration in our suspension medium when a lower alkanol is used as a solubilizing agent.

The upper limit of water concentration is established by practical rather than theoretical considerations. Under preferred conditions, complete absorption of ozone is effected at maximum rate of gas stream flow. For a given absorption unit, the maximum rate of gas flow is determined by the solubility of phenanthrene in the ozonation medium and the size of the gas bubbles contacting it. The solubility of phenanthrene in the medium is lowered by increase in water content of the latter and differs with various solubilizing agents for a given solubilizing agent water concentration. Small amounts of certain impurities in technical grade phenanthrene will increase the solubility of the phenanthrene in a given solubilizing agent. The solubility of the phenanthrene in the solubilizing agent-water mixture can also be improved as described hereabove by providing an augmented solubilizing agent comprising the primary solubilizing agent and an inert hydrocarbon solvent which is miscible therewith. Some ozonation occurs in water alone, but in such a system, the solubility of phenanthrene is poor and the absorption of ozone is slow; thus, the reaction time is unduly prolonged. We have found that in order to obtain good yields of desired products in a reasonable period of time, it is necessary to have at least about 20% by weight solubilizing agent as part of the suspension medium.

In summary, the suspension medium thus consists essentially of 5-80% by weight water and 20-95% of an organic solubilizing agent comprising a member selected from the group consisting of alkanols having from 2-4 carbon atoms, lower alkyl acetates, acetic acid, propionic acid, dioxane, chloroform and mixtures thereof, said solubilizing agent being capable of dissolving therein at least about 2% by weight water to provide a single reactive liquid phase consisting essentially of water, phenanthrene and ozone. As we have noted, when higher concentrations of water are present in the suspension medium, the primary solubilizing agent, i.e. the member selected from the aforesaid group, may be augmented by an inert hydrocarbon solvent to assist in bringing the phenanthrene into the single reactive liquid phase. The essential feature of the suspension medium is that it contain sufficient primary solubilizing agent to dissolve therein at least about 2% by weight water to permit reaction between the water and the zwitter ion.

If an alcohol is used as a solubilizing agent, a preferred suspension medium contains proportions of alcohol to water ranging between the azeotropic mixture of water and the particular alcohol and equal weight proportions (1:1) of alcohol and water.

The concentration of the phenanthrene in the suspension may vary widely. The important consideration is to provide a well-agitated suspension and thereby promote intimate contact between the ozone and the phenanthrene in solution as well as between the solubilizing agent and phenanthrene crystals, so that resaturation of the solubilizing agent with phenanthrene is attained rapidly. Generally, the suspension contains between about 5 and 30% by weight phenanthrene.

An oxygen-containing gas is used as a carrier for the ozone during the reaction. The type of gaseous carrier and the concentration of ozone therein depends upon the type of equipment used. Certain generators provide a stream of ozone in air in concentrations ranging from 0.5–8% by weight. Others provide ozone in oxygen, the concentration of ozone being between 2 and 16% by weight. The entire gamut of ozone concentrations provided by either type of generating equipment is suitable for purposes of the present invention.

We have already pointed out that it is of utmost importance to provide intimate contact between the ozone and the phenanthrene. Conventional equipment may be used to disperse the ozone in the phenanthrene suspension. It is preferable to introduce the ozone-containing gas in the form of small bubbles to insure intimacy of contact. The rate of ozone addition is determined by the ability of the phenanthrene to absorb the ozone. It is, of course, commercially desirable to ozonize as rapidly as possible. Care should be taken to avoid a rate of ozone addition greater than the rate of absorption of the ozone by the reaction mixture. Usage of ozone in this manner is obviously wasteful. Moreover, explosive mixtures of gases may be formed in the equipment. The rate of ozone addition may be conveniently governed by an ozone meter placed downstream from the reaction mixture to determine whether all of the ozone added is being absorbed.

To obtain high yields of products by the method of the present invention, it is desirable to use at least about a stoichiometric quantity of ozone based upon the starting amount of phenanthrene (a 1:1 mol ratio). Mol ratios of higher than 1:1, viz: about 2:1, are used in the direct preparation of diphenic acid, described hereafter.

The reaction between ozone and the phenanthrene is almost instantaneous. The reaction time will, therefore, depend upon the starting quantity of phenanthrene and the intimacy of the contact between ozone and the phenanthrene. The reaction is continued until the desired quantity of ozone has been absorbed.

The reaction is conducted at atmospheric pressure (although higher or lower pressures can be used) over a temperature range of −20 to 80° C. The lower limit is established by the freezing point of the solubilizing agent water mixture used. Operation at temperatures below those conveniently obtained with cooling water is possible, but generally the increased ozone solubility obtainable by this means cannot justify the high equipment costs involved. The upper limit is the boiling point of the suspension medium at the pressure used. It is less expensive, and therefore preferable, to conduct the reaction at ambient temperatures.

The conditions of hydrolysis determine the particular ortho-ortho' biphenyl derivative from phenanthrene to be obtained by the method of the present invention. If an alcohol is used as a solubilizing agent, hydrolysis and removal of the alcohol or alcohol-water azeotrope by distillation are conveniently accomplished concomitantly. Thus, to hydrolyze the periodic ozonation product of the present invention, the reaction mixture is heated to its boiling point, under reflux conditions if desired, preferably at atmospheric pressure. Since it is unnecessary to hydrolyze under total reflux, alcohol or alcohol-water azeotrope is conveniently distilled over almost immediately after the reaction mixture is brought to the required temperature for hydrolysis. Hydrolysis and distillation can be accomplished under vacuum, but it is obviously preferable to work at atmospheric pressure because of equipment costs involved. Hydrolysis and distillation can be accomplished in separate steps by first hydrolyzing the ozonation product at a temperature somewhat below the boiling point (or under total reflux) and thereafter distilling off the suspension medium. No particular advantage is seen in such a technique.

With respect to making any particular phenanthrene derivative, the pH of the reaction mixture during hydrolysis is critical. For instance, if the pH of the mixture during hydrolysis is maintained below about pH 10, diphenaldehyde is the principal product. Under preferred conditions, if the pH of the mixture during hydrolysis is above pH 10, the product obtained is primarily the "alcohol-acid," 2'-hydroxymethyl-2-biphenyl-carboxylic acid.

Diphenylaldehyde may be made in yields ranging from 80 to 95%, if hydrolysis is effected at a pH of below 10. At a neutral or slightly acid pH, hydrogen peroxide is formed as a by-product of hydrolysis. If no means is provided for hydrogen peroxide recovery following the hydrolysis step, a slightly higher pH is advantageous, since peroxides are decomposed in alkaline medium, thus preventing any possibility of explosive reaction. The pH of the system can be controlled between about 7.5 and 10 by the addition of a 2–15% by weight aqueous solution of sodium carbonate. Potassium carbonate, or other alkali metal carbonates, may be used in lieu of the sodium carbonate. After hydrolysis and removal of the solubilizing agent, diphenaldehyde precipitates as an oil, which changes to an oily solid on cooling the reaction mixture.

Unlike other aromatic aldehydes, diphenaldehyde is surprisingly stable to oxidation. It is not oxidized by air or by cold hydrogen peroxide solution. Peracetic acid attacks it very slowly. Treating diphenaldehyde with boiling nitric acid, or chlorine, converts it to 9,10-phenanthraquinone in about 50% yield. When diphenaldehyde is heated at pH above about 10, it undergoes an intra-molecular Cannizzaro reaction to form the alcohol-acid, 2'-hydroxymethyl-2-biphenyl-carboxylic acid. This latter compound is converted almost quantitatively to diphenic acid in the presence of boiling concentrated nitric acid in a manner hereinafter described. Diphenaldehyde is readily reduced by lithium aluminum hydride to form the corresponding dialcohol, 2,2'-biphenyldimethanol. The dialdehyde is readily condensed with phenols to give a light-fast dyestuff analogous to the dyes of the triphenyl methane series. When heated with urea, diphenaldehyde forms insoluble, infusible condensation products useful as ion exchange resins. Diphenaldehyde is particularly adaptable for uses wherein stability against oxidation is desirable, e.g. in perfume manufacture and in the making of light screening agents.

The alcohol-acid is made also directly by the method of the present invention. To make the alcohol-acid, the reaction mixture after ozonation is adjusted to a pH above 10 by adding an aqueous solution containing from 5–25% by weight of sodium hydroxide, potassium hydroxide, lithium hydroxide, or a comparable strong base. The reaction mixture is heated to boiling to effect hydrolysis and, if desired, to distill off concomitantly the solubilizing agent. The hydrolyzed solution is then acidified with a strong mineral acid, e.g. hydrochloric or sulfuric acid to form the desired alcohol-acid. The acidification technique is of particular importance. The product obtained upon hydrolysis is an alkali metal salt of the alcohol-acid. A slight stoichiometric excess of mineral acid is added to the mixture to completely convert this salt to the free alcohol-acid. It is advantageous to acidify when the solution is warm, i.e. at a temperature of 35-55° C., in order to precipitate the alcohol-acid in a crystalline, readily filterable form. Yields of alcohol-acid up to about 95% are obtained using the preferred conditions of the present invention.

We have already indicated that the alcohol-acid may be converted almost quantitatively to the commercially desirable diphenic acid. This conversion is accomplished by suspending the alcohol-acid in a 20 molar excess of 50% (by weight) nitric acid and heating with agitation at 90-95° C. for a period of 3-4 hours. Lower concentrations of nitric acid require a longer period of time. Higher concentrations of nitric acid impart color to the product, which results from the formation of nitro derivatives. On cooling, the diphenic acid is recovered by filtration and the excess nitric acid is re-used after its concentration has been adjusted to 50%. If oxidation is carried to a point just short of completion, residual amounts of alcohol-acid (circa 5% or less) will remain in the solution because of the greater solubility of this compound in the partly spent nitric acid. Larger amounts of residual alcohol-acid must be removed in other ways in order to obtain high purity diphenic acid. Recrystallization from suitable solvents, such as alcohol-water mixtures, is effective. Another method of removing residual alcohol-acid is by converting it to its inner ester or lactone by heating the diphenic acid-alcohol-acid mixture, either as a solid or in solvents, such as methyl-isobutyl ketone, which boil near the melting point of the alcohol-acid. The lactone is not soluble in sodium carbonate, whereas diphenic acid readily dissolves therein as its sodium salt. The alcohol-acid lactone can itself be oxidized to diphenic acid with nitric acid in the manner described, or it can be reconverted to the alcohol-acid by saponification with caustic soda and acidification.

When the hydrolysis of the ozonation product of phenanthrene is conducted at a pH below 7.5, the choice of the solubilizing agent-water system for ozonation is not important from the standpoint of the type of product obtained, since under these conditions the use of any of the solubilizing agent-water systems of the present invention results in a product which is almost entirely diphenaldehyde.

When hydrolysis is conducted at a pH above 7.5, the selection of the original suspension system is important. Under such conditions, both solubilizing agent-water mixture and degree of alkalinity of the solution during hydrolysis are important. The tertiary-butyl alcohol-water system is preferred, since the ozonation product obtained therefrom can be hydrolyzed above pH 10 (in the presence of a strong base) to give almost a complete conversion to the alcohol-acid. Using this system, hydrolysis at a pH between 7.5 and 10 yields predominently diphenaldehyde. When the ethanol-water system is used, the alcohol-acid is the principal product obtained upon hydrolysis above pH 10, although up to about 40% diphenaldehydric acid is sometimes present in the product mixture. This "aldehyde-acid" may be converted to diphenic acid by contacting it with air containing catalytic quantities of ozone. The alcohol-acid, of course, may be converted to diphenic acid by oxidation with nitric acid as hereinbefore described. At a pH of between 7.5 and 10 a mixture of products is also obtained. While the over-all yields of diphenic acid using an ethanol-water system are still high, the separate treating steps required to convert each of the intermediates to diphenic acid results in a commercially cumbersome process.

Diphenic acid is prepared directly by a particular embodiment of our invention. This is accomplished by slurrying phenanthrene in the water-solubilizing agent mixture and ozonizing with at least about two mols of ozone per mol of phenanthrene charged. The ozonation product is then hydrolyzed at a pH above 10, which is conveniently maintained by the addition of caustic, and the solubilizing agent-water azeotrope is simultaneously removed by distillation. Solvent extraction of the hydrolysis product followed by acidification gives about 40% of diphenic acid.

Referring now to the drawing.

Figure 1:
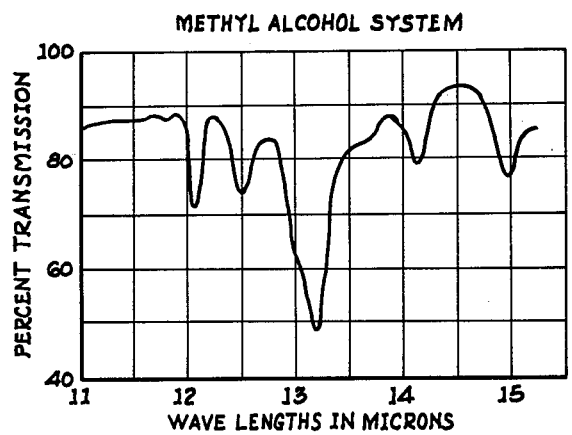
FIGURE 1 represents an infrared spectrometric analysis curve of the product obtained upon ozonation of phenanthrene in anhydrous methanol, followed by hydrolysis in the presence of 5% aqueous NaOH solution (run A, Table I).
Figure 2:
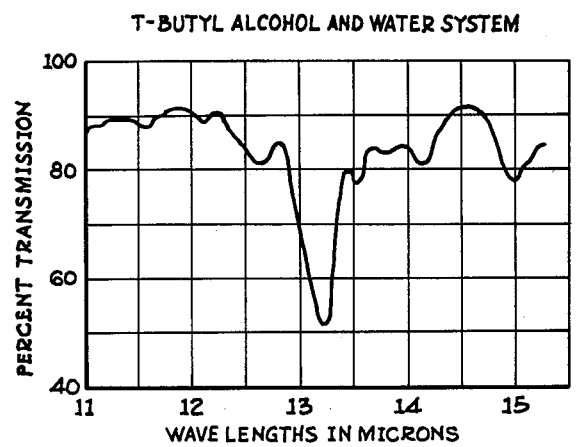
FIGURE 2 is an infrared spectrometric analysis curve of the product obtained upon ozonation of phenanthrene in a 1:1 weight mixture of tertiary-butyl alcohol and water, followed by hydrolysis in the presence of a 5% aqueous NaOH solution (run F, Table I).

FIGURE 1 is illustrative of the product of the prior art technique of Bailey, supra, viz: diphenaldehydric acid. FIGURE 2 is illustrative of the product obtained using the preferred system of the present invention. The product comprises essentially the alcohol-acid, which may be converted quantitatively to the useful diphenic acid. Structural formulas of each of the products appear for purposes of comparison:

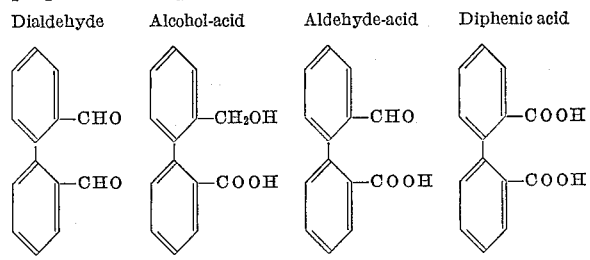

Dialdehyde   Alcohol-acid   Aldehyde-acid   Diphenic acid

The alcohol-acid and the diphenaldehyde obtained as intermediates by the method of the present invention differ from the intermediate of Bailey, diphenaldehydic acid, in that they are both in that state of oxidation which corresponds to the incorporation in the hydrocarbon of only two of the three atoms of oxygen originally present in the ozone molecule (heating the alcohol-acid drives off water to form the inner-ester in which only two atoms of oxygen are present). On the other hand, the diphenaldehydic acid is in the state of oxidation which corresponds to the incorporation in the hydrocarbon of all three atoms originally present in the ozone molecule.

Our invention is further illustrated by the following examples.

EXAMPLE I

Fifteen parts (0.084 mole) of phenanthrene were suspended in a mixture of 50 parts by weight of tertiary-butyl-alcohol and 50 parts by weight water. The absorption tower used was of small diameter, thus providing a high column of liquid and long contact time for absorption. The tower was mounted over a magnetic stirrer, operating at a speed sufficient to prevent a quiescent volume of suspension below the ozone dispersion tube. Ozonized air (containing 1.517 parts of ozone per cubic foot) was passed into the suspension at room temperature at the rate of 0.02 cubic foot per minute. 0.0945 mol of ozone was introduced, of which 0.0062 mol was recovered in a potassium iodide trap and 0.0883 mol was absorbed in the reaction mixture (amounting to 1.05 molar equivalents of the phenanthrene charged). The phenanthrene crystals in suspension diminished continually during the run, finally disappearing completely into solution after 90% of the theoretical amount of ozone had been absorbed.

150 parts of 5% aqueous sodium carbonate was added to the reaction mixture, which was then hydrolyzed by heating and simultaneously distilled at atmospheric pressure to a vapor temperature of 95° C. The distillate was weighed; its composition (indicated by specific gravity) showed that about 90% recovery of the tertiary-butyl alcohol (as the azeotrope with water) had been made.

Upon cooling, the contents of the distillation kettle comprised 14.4 parts of material melting at 58–62° C., identified as diphenaldehyde by conversion to the known di-oxime. This represents a yield of 81.5% of theory, based on the phenanthrene charged.

Acidification of the filtered sodium carbonate solution yielded 2.1 parts of material, M.P. 126.5–128.5° C., identified as crude 2'-hydroxymethyl-2-biphenyl carboxylic acid by infrared spectroscopy. Evaporation of this filtrate yielded 1.3 grams of unidentified organic material.

EXAMPLE II

Fifteen parts by weight of phenanthrene (0.0840 mol) were suspended in 109 parts of tertiary-butyl alcohol and 15 parts of water. This is the azeotropic concentration—88% tertiary-butyl alcohol and 12% water. Ozonized air (containing 1.512 parts of $O_3$ per cubic foot) was passed into the suspension at the rate of 0.02 cubic foot per minute. The absorption tower described in Example I was used for the reaction. 0.0843 mol of ozone was introduced, of which 0.0840 mol was absorbed. The quantity of ozone recovered in the trap was insignificant. The last crystals of phenanthrene went into solution after approximately 75% of the ozone had been introduced. The amount of ozone was exactly one molar equivalent of the phenanthrene charged.

100 parts of 10% aqueous caustic soda were added to the reaction mixture. The tertiary-butyl alcohol was recovered as the azeotrope with water by distillation at atmospheric pressure. Hydrolysis of the ozonation product was effected concurrently as in the previous example.

Upon cooling, the contents of the distillation kettle were extracted successively with three portions of benzene of 25 parts each. 1.3 parts of solid, M.P. 74–84° C. (subsequently shown to be phenanthrene) were recovered from the benzene. Acidification of the caustic solution yielded 16.4 parts of alcohol-acid, melting at 120–123.5° C. Recrystallization of this material from ethyl alcohol (95%) gave a product with a melting point of 134.5–135.5° C. This product was identified as the internal ester of 2'-hydroxymethyl-2-biphenyl carboxylic acid, which was formed on heating the alcohol-acid in ethyl alcohol during the recrystallization step. The yield of crude 2'-hydroxymethyl-2-biphenyl carboxylic acid (alcohol-acid) was 86% of theory based on the phenanthrene charged or 95% of theory allowing for recoverable phenanthrene.

EXAMPLE III

Ten parts of diphenaldehyde, prepared as described in Example I, were mixed with 50 parts of water and 50 parts of concentrated (70%) nitric acid and refluxed for four hours at atmospheric pressure. The reaction mixture was poured over ice and filtered. The precipitate was triturated with a 10% aqueous sodium carbonate solution, filtered and washed. The filtrate was acidified to neutrality with hydrochloric acid. 6.0 parts of phenanthraquinone were recovered. The balance of the product was found to be diphenic acid.

EXAMPLE IV

Ten parts of 2'-hydroxymethyl-2-biphenyl carboxylic acid (the "alcohol-acid"), prepared as described in Example II, were treated with a mixture of 50 parts of water and 50 parts of 70% nitric acid under reflux at atmospheric pressure for 2 hours. When the resulting product was treated by the procedure of Example III, there was recovered 9.0 parts of diphenic acid. The balance of the starting product was found to be the internal ester of the "alcohol-acid."

EXAMPLE V

One part of the "aldehyde-acid" was dissolved in 16 parts of tertiary-butyl alcohol mixed with 20 parts of water. Air, to which ozone was added in trace amounts, was bubbled through the solution for a period of one hour at room temperature. 5% aqueous caustic soda solution (10 parts) was added, and the reaction mixture was hydrolyzed and simultaneously distilled to recover the alcohol as the alcohol-water azeotrope. Upon acidification, there was recovered 0.90 parts of product shown by infrared analysis to consist of 54% diphenic acid and 45% "aldehyde-acid."

EXAMPLE VI

Five parts of phenanthrene (0.028 mol) were slurried with 46 parts of tertiary-butyl alcohol and 46 parts of water. Ozonized air containing 4.5 parts of ozone per 100 parts of air was bubbled through the suspension at room temperature until 2688 parts (0.056 mol) of ozone had been absorbed.

The ozonized solution was hydrolyzed by heating with 30 parts of 5% aqueous caustic soda and the tertiary-butyl alcohol was recovered as the azeotrope with water by distillation. The hydrolysis product was extracted with benzene. Upon evaporation of the benzene, 2.75 parts of unidentified material was recovered. Upon acidification, the caustic solution yielded 2.6 parts of material melting at 190–218° C., shown to be substantially diphenic acid (M.P. 228° C.), equivalent to a yield of 38.2% of theory based on the phenanthrene charged.

EXAMPLE VII

A series of tests were made following the procedures of the previous examples to compare a prior art method with various embodiments of the method of the present invention. The data thus obtained are shown hereunder in Table I. The table shows the weight of phenanthrene charged to the system, the composition of the suspension medium, the ozonation conditions, the conditions of hydrolysis, and the product analysis.

*Table I*

OZONATION OF PHENANTHRENE USING ALCOHOLS AND ALCOHOL-WATER MIXTURES

| Run | Phenanthrene, g. | Suspension Medium | | Ozonation temp., °C. | Ozone | | | Hydrolysis | | | Ml. Gas corr. | Weight of products | | | Assay of acids | | | |
|---|---|---|---|---|---|---|---|---|---|---|---|---|---|---|---|---|---|---|
| | | Alc. | Percent H₂O | | C.F.M. | Conc. | Mols | H₂O, Ml. | NaOH, Ml. | NaOH, percent | | Caust. insol | Residue | Acids | Alc. acid | Ester | Ald. acid | DPA |
| A | 5 | Methyl | 0 | 0 to −20 | 0.01 | 4.14 | 1.15 | 50 | 50 | 5 | 40 | 0.9 | 0.4 | 5.1 | 0 | 0 | 100 | 0 |
| B | 5 | ...do | 0 | Room | 0.02 | 8.36 | 1.1 | 50 | 50 | 5 | 20 | 1.8 | 0.4 | 4.1 | 0 | 0 | 100 | 0 |
| C | 5 | ...do | 0 | Room | 0.02 | 4.16 | 1.1 | 50 | 50 | 5 | 30 | 2.1 | 0.4 | 4.1 | 0 | 0 | 89 | 11 |
| D | 5 | Ethyl | 0 | Room | 0.02 | 4.18 | 1.1 | 50 | 50 | 5 | 60 | 2.8 | 0.4 | 3.0 | 0 | 1 | 90 | 9 |
| E | 5 | ...do | 50 | Room | 0.02 | 4.19 | 1.1 | 0 | 50 | 5 | 70 | 1.3 | 0.6 | 4.0 | 55 | 0 | 38 | 7 |
| F | 5 | T.B.A.¹ | 50 | Room | 0.02 | 8.90 | 1.08 | 0 | 50 | 20 | 220 | 0.05 | 0.5 | 5.7 | 84 | 7 | 2 | 7 |
| G | 5 | T.B.A.¹ | 50 | Room | 0.02 | 4.14 | 1.1 | 0 | 50 | 5 | 190 | 0.05 | 0.5 | 5.7 | 93 | 0 | 4 | 3 |
| H | 5 | T.B.A.¹ | 50 | Room | 0.02 | 4.16 | 1.1 | 0 | 50 | 20 | 220 | 0.05 | 0.4 | 5.8 | 99 | 0 | 1 | 0 |

¹ Tertiary-butyl alcohol.

It will be observed from run A that, using an absolute methanol suspension, the entire product was recovered as the aldehyde-acid, i.e. in the higher state of oxidation. Runs B and C show that the temperature employed has no particular effect insofar as the formation of any product in the lower state of oxidation was concerned.

Run D is comparable to run C, using ethanol instead of methanol. In run D wherein absolute ethanol was used, only 1% of the product was in the lower state of oxidation. In run E, using an ethanol-water system, 55% of the product was in the lower state of oxidation.

In runs F, G, and H, using the preferred tertiary-butanol-water system, 91–99% of the product obtained was in the lower state of oxidation.

The values reported in the column entitled "Millilitres Gas Corr." (corrected to standard conditions) were obtained by conducting the hydrolysis and alcohol recovery in a closed system, measuring the gas evolved by a leveling device and correcting to standard conditions (dry). The gas evolved is oxygen. Thus, there is a measurable relationship between the amount of oxygen evolved and the oxidation state of the product. These results are especially significant when comparing, for example, run A with runs F, G, and H. A comparison of runs A, D, and E is less definitive, since methanol and ethanol are attacked to some extent by the ozone.

EXAMPLE VIII 3 parts of diphenaldehyde (0.0143 mole) was stirred with 160 parts of 15% aqueous hydrogen peroxide solution for one hour. At the end of this time, substantially all of the diphenaldehyde had gone into solution. The solution was allowed to stand overnight. The voluminous white precipitate (the "dihydroxyperoxide") which had formed was filtered off, water washed and then dried in a vacuum oven at 40° C. The yield of "dihydroxyperoxide" was 3.13 parts (0.0128 mole) equivalent to 90% of theory based on the diphenaldehyde employed.

The "structural formula" of the "dihydroxyperoxide" is:

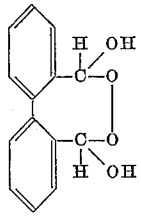

3,8-dihydroxy-4,5,6,7-dibenzo-1,2-dioxacyclooctane, M.P. 104–106° C., decomp.

As evidence of this structure, the following analytical data were obtained:

| | Theory, percent | Found, percent |
|---|---|---|
| Hydroxyl value | 13.9 | 13.1 |
| Active oxygen | 6.5 | 6.3 |
| Carbon | 68.8 | 68.3 |
| Hydrogen | 4.9 | 4.9 |

As additional evidence, infrared spectroscopic examination in a mineral oil mull showed the absence of carbonyl groups, the presence of hydroxyl groups.

EXAMPLE IX 1 part (0.0041 mole) of the "dihydroxyperoxide" was refluxed with 100 parts of 5% aqueous sodium hydroxide solution for two hours. The resulting clear solution was cooled to 5° C. in an ice-bath and acidified to pH 1 by adding concentrated hydrochloric acid dropwise. The slurry thus formed was held at 5° C. for 2 hours, then filtered to recover 0.898 parts (0.00394 mole) of ortho-hydroxymethyl-ortho'-carboxybiphenyl, melting at 143.5–144.5° C. (cor. mixed melting point with authentic ortho-hydroxymethyl-ortho'-carboxybiphenyl 143.5–144.5° C.). The yield was 96% of theory.

EXAMPLE X

Five parts of phenanthrene (0.028 mole) was slurried with 50 parts of glacial acetic acid and 15 parts of water and treated with ozonized oxygen containing 8.0% ozone until a total of 1.48 parts of ozone had been absorbed. Ozonation was conducted at room temperature at a gas flow rate of 0.808 parts per minute.

305 parts of 20% sodium hydroxide were added to the reaction mixture which was then heated to 80° C. for a period of 20 minutes. The hydrolysis product was cooled to room temperature and the insoluble material removed by extraction with chloroform. This extract, after evaporation of the chloroform, yielded 2.3 parts of diphenaldehyde identified by infrared analysis. The caustic solution was acidified to a pH 1.0 with hydrochloric acid. The precipitated material was collected, dried and found to yield 2.7 parts of material assaying 91% ortho-hydroxy-methyl-ortho'-carboxy biphenyl and 7% of diphenaldehydic acid by infrared spectroscopic analysis. Diphenaldehyde is converted quantitatively to the sodium salt of ortho-hydroxymethyl-ortho-carboxyl biphenyl when suitable contact can be obtained with caustic alkali. Expressed as product obtained recovered in the lower state of oxidation without the use of chemical reducing agents, this yield is equivalent to 77.7% of the phenanthrene charged. This is contrasted with the 54% yield of diphenaldehyde obtained by Bailey (J. Org. Chem. 23, 1092, (1958)) by the chemical reduction of the polymeric ozonide prepared from phenanthrene in 73% yield in glacial acetic acid or an overall yield of 39.6%. Thus, using glacial acetic acid-water mixtures, yields of diphenaldehyde are obtained directly which are double those obtained in the anhydrous solvent even after chemical reducing agents have been employed.

EXAMPLE XI

Five parts of phenanthrene (0.028 mole) were dissolved in 50 parts of ethyl acetate and 15 parts of water. This mixture was vigorously agitated to insure maximum contact of the two liquid layers and treated with ozonized oxygen containing 6.6% ozone until a total of 1.48 parts of ozone had been absorbed. The ozonation was conducted at room temperature at a gas flow rate of 0.808 parts per minute.

25 parts of 5% sodium bicarbonate solution were added to the reaction mixture which was then heated to about 80° C. for 20 minutes to remove the ethyl acetate. The resulting mixture was cooled and extracted with benzene. The benzene extract, after evaporation, yielded 5.2 parts of product shown by infrared analysis to be diphenaldehyde. The sodium bicarbonate portion was acidified with hydrochloric acid to a pH of 1.0. The precipitate was collected, dried and yielded 0.6 parts of acidic material assaying 62% diphenaldehydic acid and 19% ortho-hydroxy-methyl-ortho'-carboxy diphenyl and 19% of unidentified material by infrared spectroscopic analysis. This is equivalent to a yield of 90.7% diphenaldehyde based on the phenanthrene charged.

EXAMPLE XII

A.C.S. grade chloroform was purified according to the procedures used by Bailey and Mainthia, J. Org. Chem., 23, 1089 (1958) and Wibaut and de Boer, Rec. trav. chim., 78, 183 (1959). The final water content amounted to 0.016%.

1.5 parts of phenanthrene (.0084 mole) were dissolved in 50 parts of the purified chloroform. This solution was treated with ozonized oxygen containing 8.1% ozone until a total of 0.444 parts of ozone had been absorbed. The ozonation was conducted at room temperature at a gas flow rate of 0.808 parts per minute.

The ozonation mixture was examined by infrared spectroscopy and found to contain 11.2 parts of phenanthrene ozonide per part of diphenaldehyde. The diphenaldehyde yield amounted to 8.8%.

EXAMPLE XIII 1.5 parts of phenanthrene were dissolved in 50 parts of A.C.S. grade chloroform (stabilized with circa 1% ethyl alcohol) and 15 parts of water. This mixture was vigorously agitated to insure maximum contact of the two liquid layers and treated with ozonized oxygen containing 7.8% ozone until a total of 0.444 parts of ozone had been absorbed. The ozonation was conducted at 20–25° C. at a gas flow rate of 0.808 parts per minute.

After ozonation the water layer was removed from the chloroform layer which in turn was dried with anhydrous sodium sulfate and examined by infrared spectroscopy. The analysis showed the solution contained a 77.0% yield diphenaldehyde and a 21.3% yield phenanthrene ozonide.

This example illustrates the use of mixed solubilizing agents which provide a minimum (about 2% by weight) of water within the single reactive liquid phase.

This application is a continuation-in-part of our co-pending applications S.N. 682,593 filed September 9, 1957, now abandoned, application S.N. 779,529 filed December 11, 1958, now U.S. Patent 2,898,350, and application S.N. 732,081 filed April 30, 1958, now abandoned. In U.S. Patent 2,898,350, we described and claimed a novel method of ozonation of anthracene-phenanthrene mixtures, which has particular utility in respect of the difficulty separable anthracene-phenanthrene mixtures obtained from coal tar creosote. In this application, we have provided a method for treating technical grade or pure phenanthrene which is substantially anthracene free. The method of U.S. 2,898,350 differs distinctly from that of the present invention in that in the method of the patent only a very narrow range of solubilizing agents, i.e. the lower alkanols, are effective in bringing anthracene, phenanthrene water and ozone into a single reactive liquid phase. Thus, the other solubilizing agents useful in the present invention, e.g. technical grade chloroform, are completely inoperable in the process of U.S. 2,898,-350, since the ozonation of phenanthrene-anthracene mixtures in the presence of chloroform and water results in only low yields of the desired biphenyl derivatives from phenanthrene and the most of the anthracene portion of the mixture is converted to an intractable tar. This result is illustrated by the following example.

EXAMPLE XIV 5.0 parts of a mixture consisting of 74% phenanthrene, 21% anthracene and 5% unidentified material was slurried in 50 parts by weight of A.C.S. grade chloroform (stabilized with about 1% ethyl alcohol) and 15 parts by weight of water. This mixture was vigorously agitated to insure maximum contact of the two liquid layers, and treated with ozonized oxygen containing 7.1% ozone until a total of 2.03 parts of ozone had been absorbed. The ozonation was conducted at 20–25° C. at a gas flow rate of 0.808 parts per minute. After ozonation, the reaction mixture was treated with 50 parts of 5% aqueous sodium hydroxide, and the chloroform removed by distillation. The tarry residue thus obtained could not be filtered and had to be extracted with three 25 ml. portions of benzene. The benzene extracts were combined and yielded 2.8 parts of a dark oily solid upon evaporation. The anthraquinone in this material was recovered by recrystallization from xylene and amounted to 0.19 parts (15.5% yield). The caustic soluble solution from the benzene extraction was acidified to a pH of 1 and 2.5 parts of solid material, corresponding to a 52.5% yield of crude ortho-hydroxymethyl-ortho' carboxy biphenyl was recovered therefrom.

The U.S. Patent 2,942,030, which issued from application S.N. 744,638, a continuation-in-part of application S.N. 732,081, of which the present application is also a continuation-in-part, we described and claimed a method of making diphenaldehyde wherein the ozonation product made by the ozonation of phenanthrene in the presence of methyl alcohol is hydrolyzed in aqueous solution at a pH below 7.5 to form diphenaldehyde and hydrogen peroxide. The unique nature of methyl alcohol in that its admixtures with water in amounts greater than 35% water provide inadequate solubility of phenanthrene at operable temperatures render it ineffective in the process of the invention unless an additional solubilizing agent, such as chloroform, is also present. According to the process of the patent, the hydrolysis must be conducted at a pH below 7.5. The pH of the process of the present invention is not so limited and with the present process, other ortho, ortho' biphenyl derivatives from phenanthrene can be obtained.

In summary, we have provided a novel method of ozonizing phenanthrene and hydrolyzing the ozonation product to give, in high yields, ortho-ortho' biphenyl derivatives from phenanthrene. Not only have we provided an unexpected and economic route to the useful diphenic acid, but, in addition, we have set forth a method for producing in good yields the interesting and desirable intermediate, diphenaldehyde.

We claim:

1. Method of making from substantially anthracene-free phenanthrene 3,8-dihydroxy-4,5,6,7-dibenzo-1,2-dioxacyclooctane comprising reacting ozone with said phenanthrene in a reactive liquid phase within a suspension medium, said suspension medium consisting essentially of 5–80% by weight water and 20–95% by weight of an organic solubilizing agent comprising a member selected from the group consisting of alkanols having from 2–4 carbon atoms, lower alkyl acetates, acetic acid, propionic acid, dioxane, chloroform and mixtures thereof, said solubilizing agent being capable of dissolving therein at least 2% by weight water to provide a single reactive liquid phase consisting essentially of water, phenanthrene and ozone, to form 3,8-dihydroxy-4,5,6,7-dibenzo-1,2-dioxacyclooctane.

2. Method of making from substantially anthracene-free phenanthrene 3,8-dihydroxy-4,5,6,7-dibenzo-1,2-dioxacyclooctane comprising reacting at a temperature of −20 to +80° C. ozone with said phenanthrene in a reactive liquid phase within a suspension medium, said suspension medium consisting essentially of 5–80% by weight water and 20–95% by weight of an organic solubilizing agent comprising a member selected from the group consisting of alkanols having from 2–4 carbon atoms, lower alkyl acetates, acetic acid, propionic acid, dioxane, chloroform and mixtures thereof, said solubilizing agent being capable of dissolving therein at least 2% by weight water to provide a single reactive liquid phase consisting essentially of water, phenanthrene and ozone, to form 3,8-dihydroxy-4,5,6,7-dibenzo - 1,2 - dioxacyclooctane.

3. Method according to claim 2 wherein an inert hydrocarbon solvent serves as part of said organic solubilizing agent.

References Cited in the file of this patent

UNITED STATES PATENTS

| | | |
|---|---|---|
| 2,851,465 | Bailey | Sept. 9, 1958 |
| 2,857,434 | Patton | Oct. 21, 1958 |
| 2,870,194 | Bailey | Jan. 20, 1959 |
| 2,898,350 | Sturrock et al. | Aug. 4, 1959 |
| 2,930,813 | Schenk et al. | Mar. 29, 1960 |
| 2,931,829 | Schenk | Apr. 5, 1960 |
| 2,942,030 | Sturrock et al. | June 21, 1960 |

OTHER REFERENCES

Bailey et al.: J. Org. Chem., volume 23, pages 1089–92 (1958).

Wibaut et al: Rec. Trav. Chim., volume 78, pages 183–9 (1959).